United States Patent [19]  
Nakashio et al.

[11] 4,029,616  
[45] June 14, 1977

[54] POLYMER COMPOSITION OF ETHYLENIC COMPOUNDS AND PULLULAN

[75] Inventors: Seizo Nakashio, Hyogo; Kozo Tsuji; Nobuhiro Toyota, both of Ibaragi; Fumio Fujita, Osaka, all of Japan

[73] Assignees: Sumitomo Chemical Company, Limited, Osaka; Hayashibara Biochemical Laboratories, Incorporated, both of Japan

[22] Filed: Jan. 27, 1975

[21] Appl. No.: 544,573

[30] Foreign Application Priority Data

Feb. 1, 1974 Japan ............................. 49-13831

[52] U.S. Cl. ..................... 260/17.4 ST; 204/158 S; 204/159.12; 260/17.4 GC; 204/159.22; 526/910

[51] Int. Cl.$^2$ ..................... C08F 36/00; C08L 5/00

[58] Field of Search ............ 260/17.4 ST, 17.4 GC, 260/80 M, 88.3 A, 88.7 R, 88.7 F, 89.5 R, 89.5 AW, 89.5 A, 89.7 R, 92.1, 92.8 W, 93.5 R, 93.7, 94.2 R, 94.9 A; 204/159.12; 106/213; 526/910

[56] References Cited

UNITED STATES PATENTS 3,784,390  1/1974  Hijiya et al. ..................... 260/17.4  
3,888,809  6/1975  Nakashio ........................ 260/17.4

*Primary Examiner*—Edward M. Woodberry  
*Attorney, Agent, or Firm*—Stevens, Davis, Miller & Mosher

[57] ABSTRACT

A polymer composition comprising pullulan and an ethylenic compound is obtained by polymerizing the ethylenic compound in the presence of pullulan and in the presence or absence of a solvent and a catalyst. The polymer compositions are novel composition which have the characteristics of the pullulan in combination with those of the ethylenic compound, and are useful as various industrial chemicals such as vehicles of paints and inks, organic pigments, paper- and fiber-treating agents, information-recording agents, adhesives, resins, packing materials, additives for concrete and mortar, impregnate materials for wood, cosmetics, etc.

17 Claims, No Drawings

POLYMER COMPOSITION OF ETHYLENIC COMPOUNDS AND PULLULAN

This invention relates to a novel polymer composition comprising pullulan and an ethylenic compound. More particularly, the invention pertains to a novel polymer composition obtained by polymerizing an ethylenic compound in the presence of pullulan, taking advantage of the excellent water solubility and dispersion stability of the pullulan.

Pullulan is such a high molecular weight linear polymer that units of maltotriose, which is a trimer of glucose, have been repeatedly bonded through α-1,6 linkages which are different from those of said trimer, and has the molecular structure represented by the formula,

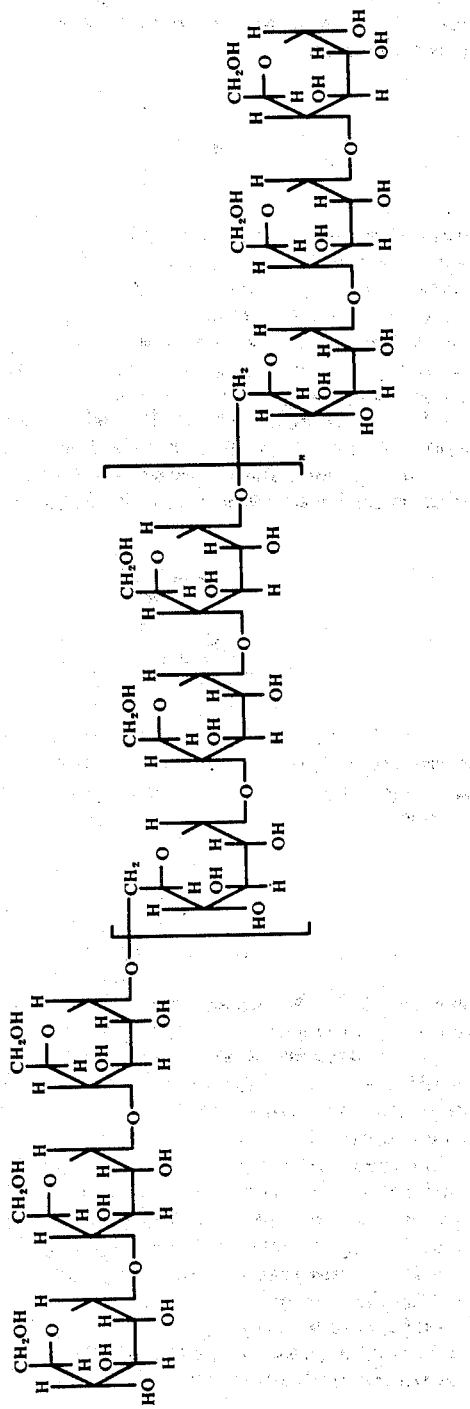

wherein $n$ is an integer of 20 to 10,000.

Heretofore, pullulan has been known merely as a water-soluble tacky substance, and not only the properties thereof have been unknown but also the uses thereof have almost been left unstudied until recently.

While the pullulan used in the present invention contains glucose units in its molecule, it is entirely different in molecular structure and greatly different in properties from starch, oxidized starch, etherized starch, cationized starch, aminated starch, cellulose, alkyl cellulose, hydroxyalkyl cellulose, carboxymethyl cellulose and gum arabic which are conventional glucose derivatives composed mainly of glucose units, like in the case of pullulan.

For example, pullulan is easily soluble in cold water, and is lower in aqueous solution viscosity than other water-soluble high polymers. Furthermore, an aqueous solution of pullulan is excellent in dispersion stability, and does not cause gelation nor the so-called "aging" phenomenon. In this respect, pullulan is greatly different from starches.

Further, according to the studies of the present inventors, it has been found that pullulan is excellent in such properties as film-forming ability, film transparency, moisture absorptivity, water solubility and tackiness, and is successfully usable in admixture with other materials as various industrial materials such as paint bases, paper-coating materials, warp-paste, adhesives, resins, films and cosmetics.

While pullulan is thus useful as mentioned above, its high water solubility sometimes results in certain disadvantages, in practice. It is therefore significant to practically utilize the pullulan, by overcoming properly such disadvantages as occasion demands according to the uses of pullulan.

On the other hand, it is well known that polymers of ethylenic compounds have been put into various uses by virtue of the properties thereof. In most cases, the polymers are water-insoluble.

In view of the above, it is worthwhile to prepare a novel composition comprising pullulan and an ethylenic polymer in order to effectively utilize the excellent characteristics of the two in combination.

In developing a composition comprising pullulan and an ethylenic polymer, mere mechanical mixing of the two polymers cannot give any homogeneous composition. This is because the mixing of two or more high polymers, in general, is advantageously conducted in a molten, solution or plasticized state, in practice. However, pullulan has no melting point and is not thermoplastic per se. Further, pullulan is soluble only in several solvents such as water, formamide, dimethyl formamide and dimethyl sulfoxide. Accordingly, it is not easy to obtain a homogeneous composition by mixing pullulan with an ethylenic polymer.

With an aim to overcome the above-mentioned problem so as to obtain a homogenous composition comprising pullulan and an ethylenic polymer, the present inventors have made extensive studies and accomplished the present invention.

An object of the present invention is to provide a novel homogeneous polymer composition prepared by polymerizing an ethylenic compound in the presence of pullulan.

Another object of the invention is to provide a novel polymer composition having the characteristics of pullulan in combination with those of the ethylenic compound.

Other objects and advantages of the invention will become apparent from the following description.

The pullulan used in the present invention is not particularly limited in process for production thereof, and may be obtained by biochemical synthetic process. At present, it can be isolated and recovered as a tacky substance secreted in a culture liquor of a strain belonging to the genus Pullularia which is an incomplete microorganism. That is, a strain of the species *Pullularia pullulans* is subjected to a shaking culture at 24° C. for 5 days in a medium containing 10% of partially hydrolyzed starch, 0.5% of $K_2HPO_4$, 0.1% of NaCl, 0.02% of $MgSO_4\cdot7H_2O$, 0.06% of $(NH_4)_2SO_4$ and 0.04% of yeast extract, whereby pullulan is obtained as a tacky substance secreted from the cells into the culture liquor. If necessary, the cells are removed by centrifugation from the culture liquor, and the supernatant is charged with methanol to deposit a precipitate. After repeating water dissolution and methanol precipitation, purified pullulan is recovered.

Pullulan somewhat varies in physical properties depending upon the kind of strain used. In the present invention, however, pullulan obtained from any strain may be used.

The molecular weight of the pullulan used in the present invention is not particularly limited, but is preferably at least 10,000 and more preferably from 10,000 to 5,000,000 in view of its viscosity in aqueous solution.

According to the present invention, the polymerization of an ethylenic compound in the presence of pullulan is not particularly restricted in procedure, and may be carried out in the presence or absence of a solvent and a catalyst. For example, the polymerization may be effected by adoption of a process using a bulk polymerization system consisting only of pullulan and an ethylenic compound, or a solution or dispersion system formed by adding a solvent to said bulk polymerization system. It is also possible to use the ethylenic compound in the form of a gas.

Solvents usable in the present invention are general compounds which include, for example, water; alcohols such as methanol, ethanol, propanol, isopropanol, ethylene glycol, propylene glycol, butylene glycol, polyethylene glycol, polypropylene glycol and glycerin; aromatic hydrocarbons such as benzene, toluene, xylene, ethylbenzene and cumene; aliphatic and alicyclic hydrocarbons such as propane, butane, pentane, hexane, heptane, cyclohexane and methylcyclohexane; halogenated and nitrated derivatives of said hydrocarbons such as 1-chloropropane, 2-chloropropane, 1-chlorobutane, 1-chloro-2-methylpropane, 2-chloro-2-methylpropane, 1-chloropentane, chlorobenzene, 1-chloronaphthalene, dichloromethane, chloroform, carbontetrachloride, 1,1-dichloroethane, 1,2-dichloroethane, 1,1,1-trichloroethane, 1,1,2,2-tetrachloroethane, pentachloroethane, o-dichlorobenzene, m-dichlorobenzene, p-dichlorobenzene, 3-chloropropene, 1-bromopropane, 2-bromopropane, bromobenzene, bromoform, 1,2-dibromoethane, 1,1,2,2-tetrabromoethane, iodomethane, iodoethane, 1-iodopropane, 2-iodopropane, nitromethane, nitroethane, 1-nitropropane, 2-nitropropane and nitrobenzene; ketones such as acetone, methyl ethyl ketone and acetophenone; ethers such as diethyl ether, dioxane and tetrahydrofuran; and esters such as methyl acetate, butyl acetate, ethyl propionate and methyl benzoate. When water is used as the solvent, there is obtained a particularly characteristic product because pullulan is water-soluble, while most ethylenic compounds are water-insoluble. Further, an aqueous solution of pullulan is relatively low in viscosity as compared with that of other water-soluble high polymers, and pullulan itself is high in dispersion stability. When such dispersion system as above is adopted, therefore, a latex-like product is finally obtained in most cases. Thus, the adoption of a dispersion system has such an advantage that the resulting latex-like product can actually be used as it is without application of any after-treatment to the product, unlike the case of bulk- or solution-polymerization systems.

The amount of the solvent used in the present invention is not particularly limited, but is at least 5 weight %, preferably 20 to 20,000 weight %, based on the weight of the ethylenic compound.

Examples of the ethylenic compounds used in the present invention are compounds represented by the general formula,

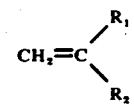

wherein $R_1$ is H, a $C_1$–$C_4$ hydrocarbon group, a halogen, or a hydroxyl group; and $R_2$ is H, a $C_1$–$C_4$ hydrocarbon group, a halogen, —$OCOR_3$ (where $R_3$ is a $C_1$–$C_{18}$ hydrocarbon group), —$COOR_4$ (where $R_4$ is H, an alkali metal, an alkaline earth metal, a $C_1$–$C_{12}$ hydrocarbon group, or a halogen- or hydroxyl group-, alkoxy group- or epoxy group-substituted derivative thereof), —CN, —$CONR_5R_6$ (where $R_5$ and $R_6$ are independently H, a $C_1$–$C_{12}$ hydrocarbon group, or a halogen-, hydroxyl group-, alkoxy group- or epoxy group-substituted derivative thereof), —$CH=CH_2$, or

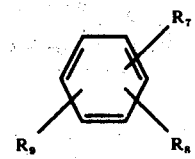

(where $R_7$, $R_8$ and $R_9$ are independently H, a $C_1$–$C_4$ hydrocarbon group, a halogen, a hydroxyl group or an alkoxy group); compounds represented by the general formula,

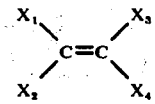

wherein $X_1$, $X_2$, $X_3$ and $X_4$ are independently H, a halogen, or —$COOR_1$ (where $R_1$ is a $C_1$–$C_4$ hydrocarbon group, an alkali metal or an alkaline earth metal), provided that $X_2$ and $X_4$ should always be substituents other than H; and/or such ethylenic compounds as maleic anhydride and anhydrous maleimide.

Concrete examples of these ethylenic compounds are ethylene, propylene, butylene, vinyl acetate, vinyl propionate, vinyl butyrate, acrylic acid, sodium acrylate, methyl acrylate, ethyl acrylate, propyl acrylate, butyl acrylate, methacrylic acid, methyl methacrylate, ethyl methacrylate, propyl methacrylate, butyl methacrylate, 2-ethylhexyl methacrylate, decyl methacrylate, lauryl methacrylate, stearyl methacrylate, hydroxymethyl methacrylate, hydroxyethyl methacrylate, hydroxypropyl methacrylate, glycidyl methacrylate, acrylonitrile, methacrylonitrile, acrylamide, butadiene, styrene, α-methylstyrene, p-chlorostyrene, 2,4-dichlorostyrene, p-nitrostyrene, p-methoxystyrene, p-methylstyrene, m-methylstyrene, p-phenylstyrene, p-acetoxystyrene, p-aminostyrene, m-cyanostyrene, vinyl chloride, vinylidene chloride, vinylidene fluoride, tetrafluoroethylene, maleic anhydride and anhydrous maleimide. Preferable among these are vinyl acetate, acrylic acid, methyl acrylate, methacrylic acid, methyl methacrylate, ethyl methacrylate, hydroxyethyl methacrylate, hydroxypropyl methacrylate, lycidyl methacrylate, acrylonitride, methacrylonitrile, acrylamide, butadiene, styrene and maleic anhydride. These ethylenic compounds may be used not only singly but also in the form of a mixture of two or more compounds. The mixing ratio of the compounds may be suitably selected according to the desired object and is not particularly limited. The amount of the ethylenic compound to be used is not particularly restricted, but is 1 to 95 weight %, preferably 5 to 90 weight %, based on the weight of the solid content of the resulting composition.

In polymerizing the ethylenic compound according to the present invention, an optional compound may be used as a catalyst, if necessary. That is, except in the case where the polymerization can proceed even in the absence of catalyst, there may be used, in general, a known catalyst such as a radical polymerization initiator or a cationic, anionic or coordinated anionic polymerization initiator. In practicing the process of the present invention in the aforesaid water-containing system which is a dispersion system in most cases, it is preferable and practical to use a radical polymerization initiator, in general.

Examples of the radical polymerization initiator are hydrogen peroxide aqueous solution, ammonium persulfate, potassium persulfate, cerium (IV) salt; azonitriles such as azobis-isobutyronitrile, azobis-methylbutyronitrile, azobis-methyl valeronitrile, azobis-trimethylbutyronitrile and azobis-isopropylbutyronitrile; alkyl peroxides such as methyl peroxide, propyl peroxide, t-butyl peroxide, cumene hydroperoxide, diisopropylbenzene hydroperoxide, and 2,5-dimethylhexane-2,5-dihydroperoxide; dialkyl peroxides such as di-t-butyl peroxide, t-butyl-cumene peroxide, dicumyl peroxide, α, α'-bis(t-butylperoxy)-p-isopropylbenzene, 2,5-dimethyl-2,5-di(t-butylperoxy)hexane and 2,5-dimethyl-2,5-di(t-butylperoxy)hexyne; diacylperoxides such as acetyl peroxide, propionyl peroxide, isobutyryl peroxide, octanoyl peroxide, decanonyl peroxide, lauroyl peroxide, stearoyl peroxide, benzoyl peroxide and p-chlorobenzoyl peroxide; peroxy esters such as t-butylperoxy acetate, t-butylperoxy isobutyrate, t-butylperoxy pivalate, t-butylperoxy-2-ethylhexanoate, t-butylperoxy laurate, t-butylperoxy benzoate, di-t-butyldiperoxy phthalate, 2,5-dimethyl-2,5-di(benzoylperoxy) hexane, t-butylperoxy maleic acid and t-butylperoxyisopropyl carbonate; and ketone peroxides such as methylethylketone peroxide, cyclohexanone peroxide and 1,1-bis(t-butylperoxy)cyclohexane. Particularly preferable among these are hydrogen peroxide aqueous solution, potassium persulfate, ammonium persulfate and cerium (IV) salt.

Alternatively, there may be employed a process utilizing the irradiation with ultraviolet lights or radiations, or the oscillation of ultrasonic waves.

Examples of the anionic polymerizaion initiator are metallic lithium, butyl lithium, lithium naphthalene, metallic sodium, triphenylmethyl sodium, sodium cyanide, sodium naphthalene, sodium benzophenone, amyl sodium isopropoxide, active strontium carbonate and the like.

Examples of the cationic polymerization initiator are sulfuric acid, phosphoric acid, perchloric acid, monochloroacetic acid, boron trifluoride, aluminum trichloride, stannic chloride, iodine, t-butyl chloride and the like.

Examples of the coordinated anionic polymerization initiator are titanium tetrachloride-triethylaluminum, titanium trichloride-triethylaluminum, and the like.

The amount of the catalyst used in the present invention is not particularly limited, but is preferably 0.0001 to 10 weight % based on the weight of the ethylenic compound.

The reaction conditions to be adopted are not particularly limited either, but the reaction temperature is ordinarily $-120°$ to $200°$ C., preferably $-78°$ to $150°$ C., and the reaction pressure is ordinarily 0.01 to 3,000 kg/cm$^2$, preferably 1 to 2000 kg/cm$^2$.

When an ethylenic compound is polymerized in the presence of pullulan according to the process of the present invention, there are some cases where the ethylenic compound is graft-copolymerized onto the pullulan, instead of a mere mixture of the two. In such cases, therefore, there is obtained an extremely characteristic composition. That is, pullulan is non-plastic and water-soluble, whereas most of ethylenic polymers are plastic and water-insoluble, so that characteristics of the two polymers act synergistically to give a characteristic composition.

When water is used as solvent in polymerizing an ethylenic compound in the presence of pullulan according to the present process, as mentioned previously, the features of the present invention can sufficiently be displayed. That is, when water is used, pullulan is easily dissolved in the water to form an aqueous pullulan solution, which is relatively low in viscosity so that the concentration of pullulan in the finally obtained latex-like composition can be made high. In the case of an aqueous solution of other water-soluble high polymer, the viscosity of the solution is already high even at the time of initiation of the reaction, so that the reaction does not progress smoothly to make it difficult to obtain a composition high in concentration of said polymer. In order to make pullulan display some properties which cannot be exhibited by the single use of an ethylenic polymer, a composition high in pullulan content is sometimes required. In this sense, the present invention, in which pullulan is used, can sufficiently display its features.

According to the present invention, it is also possible to obtain a highly homogeneous emulsion containing ethylenic polymer and pullulan at high concentrations. Further, this composition is useful as a novel composition having the excellent properties of pullulan and those of the ethylenic compound.

It is also involved in the technical scope of the present invention to incorporate into the compositions of the invention, according to the application purposes thereof, any of surfactants, plasticizers, colorants, film-forming adjuvants, defoaming agents, antifungal agents, antioxidants, etc.

The compositions of the present invention are useful as various industrial chemicals such as vehicles of paints and inks, organic pigments, paper- and fiber-treating agents, information-recording agents, adhesives, resins, packing materials, additives for concrete and mortar, impregnate materials for wood, and cosmetics, etc.

The present invention is illustrated in detail below with reference to Examples, but the invention is not limited to the Examples. In the examples, all parts are by weight.

EXAMPLE 1

In a four-necked flask equipped with a reflux condenser, a stirrer, a thermometer, an inert gas-introducing pipe and a dropping funnel, 20 parts of pullulan having a molecular weight of 150,000 was homogeneously dissolved in 100 parts of water to form an aqueous pullulan solution having a viscosity of 300 cps. This solution was heated to 60° C. with stirring and with introduction of nitrogen gas, and then charged with 20 parts of vinyl acetate and 0.1 part of potassium persulfate, and the resulting mixture was polymerized at 60° C. for 6 hours. In the above case, the vinyl acetate was suspended in the aqueous pullulan solution when the reaction liquid was stirred, but the solution became turbid as the polymerization progressed to give finally a homogeneous aqueous emulsion.

This aqueous emulsion was favorable in storage stability and showed no such phenomenon as gelation or agglomeration even when allowed to stand in air at room temperature for a month. The emulsion had a viscosity of 3,000 cps.

The emulsion was freed from the solvent by evaporation, and 20 parts of the residue was extracted by means of a Soxhlet's extractor using methanol as an extraction solvent. From the resulting extract, the extraction solvent was removed by evaporation to obtain 6.5 parts of polyvinyl acetate. Graft ratio was 35%. The graft ratio was defined as $$\frac{\text{amount of grafted monomer}}{\text{total amount of polymerized monomer}}$$

and was calculated by the equation $$\frac{\text{total solid} - \text{amount of pullulan} - \text{amount of homopolymer}}{\text{total solid} - \text{amount of pullulan}}$$

EXAMPLE 2

To 140 parts of the pullulan-polyvinyl acetate emulsion obtained in Example 1, 3.2 parts of sodium hydroxide were added to prepare a homogeneous emulsion. Using this emulsion, two birch sheets were bonded to each other at 140° C. for 10 seconds. As the result, the adhesive strength was 103 kg/cm² at 27° C. and 70% RH.

Comparative Example 1

Vinyl acetate was polymerized in the same manner as in Example 1, except that the pullulan was replaced by polyvinyl alcohol having a saponification degree of 88% and a polymerization degree of 500. As the result, the viscosity of the polymerization product became 50,000 cps. and the reaction liquid was not homogenous.

EXAMPLES 3, 4 and 5

Example 1 was repeated, except that the vinyl acetate was replaced by each of n-butyl acrylate, methyl methacrylate and styrene. The results obtained were as shown in Table 1.

Table 1

|  | Monomer used | Viscosity (cps) | Graft ratio (%) |
|---|---|---|---|
| Example 3 | n-Butyl acrylate | 2,600 | 83 |
| Example 4 | Methyl methacrylate | 2,800 | 42 |
| Example 5 | Styrene | 2,300 | 99 |

The aqueous emulsion of Example 3 was cast on a glass plate, whereby a tough film was obtained.

On the other hand, a coating material was prepared by mixing 52 parts of the aqueous emulsion of Example 3 with 100 parts of kaolin clay, 0.3 part of sodium hexametaphosphate and 80 parts of water. This coating material was manually coated by use of a bar coater (wire rod No. 14) on an original paper (KYP made by Sanyo Kokusaku Pulp Co.), dried with hot air at 100° C. for one minute, and then subjected two times to super-calendering at 60° C and 120 kg/cm to obtain a coated paper. The gloss of the coated paper measured according to JIS P8142 was 80% and thus was excellent.

What is claimed is:

1. A polymer composition obtained by polymerizing an ethylenic compound selected from the group consisting of compounds represented by the formula,

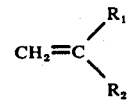

wherein
$R_1$ is H, a $C_1$–$C_4$ hydrocarbon group, a halogen or a hydroxyl group; and
$R_2$ is H, a $C_1$–$C_4$ hydrocarbon group, a halogen, —O-$COR_3$ where $R_3$ is a $C_1$–$C_{18}$ hydrocarbon group, —$COOR_4$ where $R_4$ is H, an alkali metal, an alkaline earth metal, a $C_1$–$C_{12}$ hydrocarbon group, or a halogen-, hydroxyl group-, alkoxy group- or epoxy group- substituted derivative thereof; —CN, —$CONR_5R_6$ where $R_5$ and $R_6$ are independently H, a $C_1$–$C_{12}$ hydrocarbon group or a halogen-, hydroxyl group-, or alkoxy group-, or epoxy group-substituted derivative thereof; —CH=$CH_2$, or

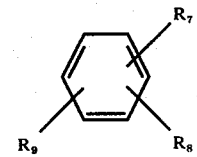

where $R_7$, $R_8$, and $R_9$ are independently H, a $C_1$–$C_4$ hydrocarbon group, a halogen, a hydroxyl group or an alkoxy group; or compounds represented by the formula

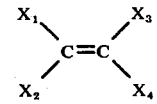

wherein $X_1$, $X_2$, $X_3$, and $X_4$ are independently H, a halogen or —$COOR_1$ where $R_1$ is a $C_1$–$C_4$ hydrocarbon group, an alkali metal or an alkaline earth metal, with the proviso that $X_2$ and $X_4$ are substituents other than H; maleic anhydride and anhydrous maleimide in the presence of pullulan having a molecular weight of 10,000 to 5,000,000
and in the presence or absence of a solvent and a catalyst,
said ethylenic compound being present in an amount of 5 to 90 weight % based on the solid content of the resulting composition and the remainder of the solid content being said pullulan.

2. A polymer composition according to claim 1, wherein the ethylenic compound represented by the general formula,

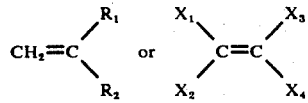

is ethylene, propylene, butylene, vinyl acetate, vinyl propionate, vinyl butyrate, acrylic acid, sodium acrylate, methyl acrylate, ethyl acrylate, propyl acrylate, butyl acrylate, methacrylic acid, methyl methacrylate, ethyl methacrylate, propyl methacrylate, butyl methacrylate, 2-ethylhexyl methacrylate, decyl methacrylate, lauryl methacrylate, stearyl methacrylate, hydroxymethyl methacrylate, hydroxyethyl methacrylate, hydroxypropyl methacrylate, glycidyl methacrylate, acrylonitrile, methacrylonitrile, acrylamide, butadiene, styrene, α-methylstyrene, p-chlorostyrene, 2,4-dichlorostyrene, p-nitrostyrene, p-methoxystyrene, p-methylstyrene, m-methylstyrene, p-phenylstyrene, p-acetoxystyrene, p-aminostyrene, m-cyanostyrene, vinyl chloride, vinylidene chloride, vinylidene fluoride or tetrafluoroethylene.

3. A polymer composition according to claim 1, wherein the ethylenic compound is at least one member selected from the group consisting of vinyl acetate, acrylic acid, methyl acrylate, methacrylic acid, methyl methacrylate, ethyl methacrylate, hydroxyethyl methacrylate, hydroxypropyl methacrylate, glycidyl methacrylate, acrylonitrile, methacrylonitrile, acrylamide, butadiene, styrene and maleic anhydride.

4. A polymer composition according to claim 1, wherein the solvent is water, methanol, ethanol, propanol isopropanol, ethylene glycol, propylene glycol, butylene glycol, polyethylene glycol, polypropylene glycol, glycerin, benzene, toluene, xylene, ethyl benzene, cumene, propane, butane, pentane, hexane, heptane, cyclohexan, methylcyclohexane, 1-chloropropane, 2-chloropropane, 1-chlorobutane, 1-chloro-2-methylpropane, 2-chloro-2-methylpropane, 1-chloropentane, chlorobenzene, 1-chloronaphthalene, dichloromethane, chloroform, carbontetrachloride, 1,1-dichloroethane, 1,2-dichloroethane, 1,1,1-trichloroethane, 1,1,2,2-tetrachloroethane, pentachloroethane, o-dichlorobenzene, m-dichlorobenzene, p-dichlorobenzene, 3-chloropropene, 1-bromopropane, 2-bromopropane, bromobenzene, bromoform, 1,2-dibromoethane, 1,1,2,2-tetrabromoethane, iodomethane, iodoethane, 1-iodopropane, 2-iodopropane, nitromethane, nitroethane, 1-nitropropane, 2-nitropropane, nitrobenzene, acetone, methyl ethyl ketone, acetophenone, diethyl ether, dioxane, tetrahydrofuran, methyl acetate, butyl acetate, ethyl propionate or methyl benzoate.

5. A polymer composition according to claim 1, wherein the solvent is water.

6. A polymer composition according to claim 1, wherein the amount of the solvent is at least 5 weight % based on the weight of the ethylenic compound.

7. A polymer composition according to claim 1, wherein the catalyst is radical polymerization initiator, a cationic polymerization initiator, an anionic polymerization initiator, or a coordinated anionic polymerization initiator.

8. A polymer composition according to claim 7, wherein the radical polymerization initiator is hydrogen peroxide aqueous solution, ammonium persulfate, potassium persulfate, cerium (IV) salt, azobis-isobutyronitrile, azobis-methylbutyronitrile, azobis-methylvaleronitrile, azobis-trimethylbutyronitrile, azobisisopropylbutyronitrile, methyl peroxide, propyl peroxide, t-butyl peroxide, cumene hydroperoxide, diisopropylbenzene hydroperoxide, 2,5-dimethylhexane-2,5-dihydroperoxide, di-t-butyl-peroxide, t-butyl cumene peroxide, dicumyl peroxide, α,60 '-bis(t-butylperoxy)-p-isopropylbenzene, 2,5-dimethyl-2,5-di(t-butylperoxy) hexane, 2,5-dimethyl-2,5-di(t-butylperoxy)hexyne, acetyl peroxide, propionyl peroxide, isobutyryl peroxide, octanoyl peroxide, decanonyl peroxide, lauroyl peroxide, stearoyl peroxide, benzoyl peroxide, p-chlorobenzoyl peroxide, t-butylperoxy acetate, t-butylperoxy isobutyrate, t-butylperoxy pivalate, t-butylperoxy-2-ethylhexanoate, t-butylperoxy laurate, t-butylperoxy benzoate, di-t-butyldiperoxy phthalate, 2,5-dimethyl-2,5-di(benzoylperoxy)hexane, t-butylperoxy maleic acid, t-butylperoxyisopropyl carbonate, methyl ethyl ketone peroxide, cyclohexanone peroxide or 1,1-bis(t-butylperoxy)cyclohexane.

9. A polymer composition according to claim 7, wherein the radical polymerization initiator is hydrogen peroxide aqueous solution, potassium persulfate, ammonium persulfate or cerium (IV) salt.

10. A polymer composition according to claim 7, wherein the addition of the radical polymerization initiator is replaced by the irradiation with ultraviolet light or radiations or the oscillation of ultrasonic waves.

11. A polymer composition according to claim 7, wherein the anionic polymerization initiator is metallic lithium, butyl lithium, lithium naphthalene, matallic sodium, triphenylmethyl sodium, sodium cyanide, sodium naphthalene, sodium benzophenone, amyl sodium-sodium isopropoxide or active strontium carbonate.

12. A polymer composition according to claim 7, wherein the cationic polymerization initiator is sulfuric acid, phosphoric acid, perchloric acid, monochloroacetic acid, boron trifluoride, aluminum trichloride, stannic chloride, iodine or t-butyl chloride.

13. A polymer composition according to claim 7, wherein the coordinated anionic polymerization initiation is titanium tetrachloride-triethylaluminum or titanium trichloride-triethylaluminum.

14. A polymer composition according to claim 1, wherein the amount of the catalyst is 0.0001 to 10 weight % based on the weight of the ethylenic compound.

15. A polymer composition according to claim 1, which is obtained by effecting the polymerization at a temperature of −120° to 200° C. under a pressure of 0.01 to 3000 kg/cm².

16. A polymer composition according to claim 1, which is obtained by using water as the solvent and a radical polymerization initiator as the catalyst.

17. A polymer composition according to claim 1, which is obtained by using water as the solvent and hydrogen peroxide aqueous solution, potassium persulfate, ammonium persulfate or cerium (IV) salt as the catalyst.

* * * * *